April 22, 1969  R. HUBER  3,440,104
GALVANIC DRY CELLS

Filed April 13, 1966

INVENTOR.
RICHARD HUBER
BY
Gerard J. Weiser
ATTORNEY.

INVENTOR.
RICHARD HUBER
BY
ATTORNEY.

United States Patent Office 3,440,104
Patented Apr. 22, 1969

3,440,104
GALVANIC DRY CELLS
Richard Huber, Ellwangen, Germany, assignor to Varta Pertrix Union Gesellschaft mit beschrankter Haftung, Ellwangen, Jagst, Germany, a corporation of Germany
Filed Apr. 13, 1966, Ser. No. 542,390
Claims priority, application Germany, May 14, 1965, V 28,473
Int. Cl. H01m 17/04
U.S. Cl. 136—103        10 Claims

ABSTRACT OF THE DISCLOSURE

A galvanic dry cell comprising a positive electrode assembly, a surrounding negative zinc electrode, an aqueous zinc chloride electrolyte solution therein, and an alkaline substance adjacent to the outer surface to the negative electrode.

---

This invention relates to galvanic dry cells having an aqueous solution of zinc chloride as electrolyte and in particular to cells of the well known paper-lined construction.

Such dry cells are capable of delivering relatively high currents and for many applications are superior to cells having electrolytes containing appreciable quantities of ammonium chloride. A further advantage of such dry cells is that the tendency to leakage is relatively low. However, up to the present it has not been possible to produce dry cells with zinc chloride electrolyte which are absolutely leakproof.

The behavior of dry cells with zinc chloride electrolyte during discharge was therefore made the subject of experimental investigation, with the object of developing a leakproof dry cell, especially in paper-lined construction, on the basis of the results obtained.

The investigation revealed that cells with zinc chloride electrolyte become steadily drier as the discharge proceeds and the pH increases. This observation may be attributed to the precipitation and basic zinc chlorides which contain up to eight parts of combined water. However, this self-drying property is appreciable only after the pH has increased to values greater than 6, which occurrs only after discharge has proceeded for some time. Under short circuit conditions, perforation of the zinc anode (usually in cup form) occurs in about 1 to 2 hours. This period is much too short to allow any appreciable pH increase at the zinc surface with the result that the anolyte can flow freely via the perforations to the outside of the zinc anode.

Another observed characteristic of this type of dry cell under heavy current discharge or short circuit conditions is noteworthy. Immediately after closing the external circuit, liquid begins to accumulate between the inner surface of the zinc anode and the external surface of the separator. As the discharge proceeds, the amount of liquid increases, the excess volume being extruded into the expansion chamber located directly above the depolarizer. After 10 to 15 minutes of discharge, no further increase in volume can be observed and in the course of the next one of two hours the liquid is re-absorbed into the depolarizer mix, presumably because the cell temperature is at this time decreasing. Analysis of the extruded liquid shows it to be a concentrated (about 60%) aqueous solution of zinc chloride.

From the aforementioned results it would appear necessary, in order to ensure that the cell is leakproof, to provide some means of immobilizing any electrolyte which may be extruded through perforations in the zinc anode. This immobilization can be achieved according to the invention by the application of an alkaline substance to the outer surface of the zinc anode. The electrolyte which collects in the expansion chamber at the beginning of heavy discharge may be immobilized by the inclusion of absorbent material in the expansion chamber.

As alkaline substance for application to the outer surface of the zinc anode any substance which increases the pH of the extruded electrolyte may be used, for example ZnO, NaOH, MgO and CaO. The later substance, CaO, is specially suitable for this purpose and gave very favourable results during the experimental work. The alkaline substance may be applied in the form of a dry powder by first sprinkling it onto the adhesive surface of an adhesive tape, the excess material being removed by a blast of compressed air. The prepared adhesive tape is tape applied to the cell so that the alkaline substance is adjacent to the zinc anode. An alternative method is to prepare a concentrated solution of the alkaline substance which is then allowed to penetrate into an absorbent cardboard tube. After drying, the tube is then fitted to the cell in the usual manner. Still another possibility is add the alkaline substance to the suspension of cellulose fibres during manufacture of the cardboard or paper which is then used to form a tube as previously or which can be applied in the form of an adhesive paper tape to the dry cell. This technique is specially suited to the use of the less soluble alkaline earth hydroxides such as $Ca(OH)_2$, $Ba(OH)_2$ etc. Still another variation of the method of application can be complemented when the cell is provided with an external holder in cup-form. The alkaline substance can then be filled into the space between the zinc anode and the external container. Experiments have shown that the alkaline substance must be present in an amount at least equal to 1 gr. per sq. metre and preferably amounting to 5 gm./m.$^2$.

The electrolyte which collects in the expansion chamber may be immobilized by absorption in one or more perforated washers made from standard bibulous materials, (such as kraft paper or cardboard) or in some fibrous material such as cotton wool, Webril etc.

Various methods of carrying out the invention will now be described with the help of the accompanying diagrams.

In the illustrated cell embodiments similar parts are identified by like reference numerals, and some conventional components, especially at the top and bottom thereof, which do not enter into the present invention are not specifically identified.

Figure 1:
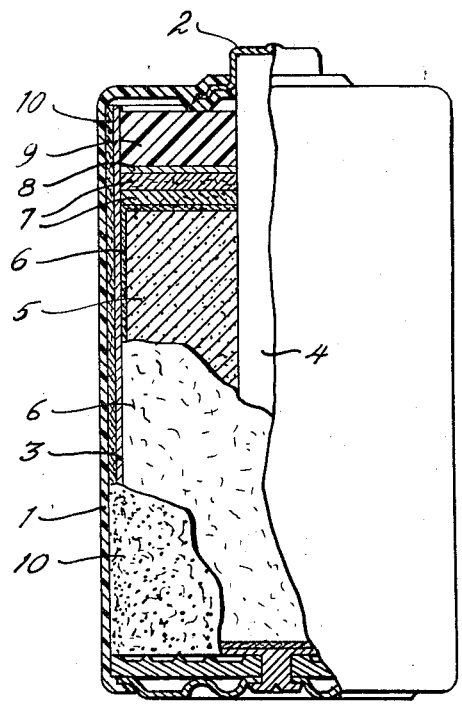
FIG. 1 is an elevational view of a dry cell embodying the present invention, shown partly cut away and in section.

FIG. 1 shows, in elevation and partly cut away and sectioned to reveal the interior, a first embodiment of dry cell according to this invention. Plastic covering 1 encloses the sides and also parts of the top and bottom of the cell. Protruding therefrom at the top center is carbon rod 4 covered by metallic cap 2. Depolarizer bobbin 5 surrounds the lower major portion of the carbon rod and is itself surrounded by separator 6, which is made of paper, for example, as is customary with paper-lined cells. Cuplike electrode 3, which is composed of zinc, surrounds the cylindrical wall (and flat bottom) of the paper lining and extends for the full length of the cylindrical wall of the outer plastic covering, being separated therefrom by cardboard layer 10, which carries the alkali-reacting substance.

Immediately above the top surface of the paper lining 6 about depolarizer bobbin 5 are a pair of absorbent washers 7, which fit closely about carbon rod 4 and inside the upper end of cuplike electrode 3. Above these washers is the perforated washer 8 and sealing compound 9, above which is an air space beneath the top portion of outside plastic covering 1. The absorbent washers take up a substantial part of the electrolyte solution, especially when the cell is subjected to a heavy load. However, in the event of escape of electrolyte from the cuplike electrode, for example through perforations in the metal wall, the alkaline substance associated with cardboard layer 10 reacts with and immobilizes such escaping electrolyte.

Figure 2:
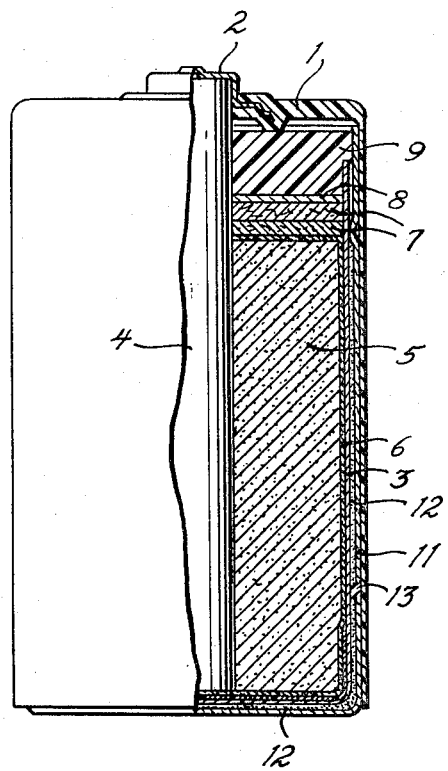
FIG. 2 is an elevational view, also partly in section, of another dry cell embodying this invention.

FIG. 2 shows similarly a dry cell much like that of the preceding view but altered somewhat and constituting a second embodiment of this invention. In addition to minor changes in design at the bottom and to a lesser extent the top of the cell, with which this invention is not particularly concerned, this embodiment differs by having an additional metallic cup 11 separated from cuplike electrode 3 by the space 12 containing the alkaline substance, which may be adherent to either or both of the cups. This additional cup is also composed of zinc and is crimped into contact with the first cup near the top alongside one of absorbent washers 7 and for better contact is provided with several inwardly extending projections 13 nearer the junction with the bottom. Escaping electrolyte solution is retained in the additional zinc cup and reacts with the alkaline substance in the space between the pair of zinc cups.

Figure 3:
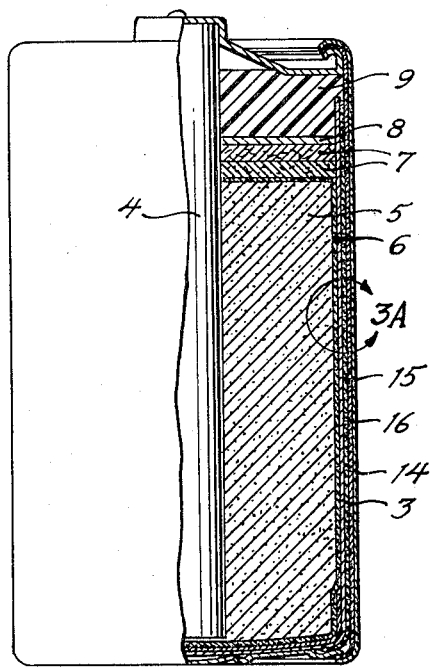
FIG. 3 is a similar view of a further embodiment of the invention in a dry cell.
Figure 3A:
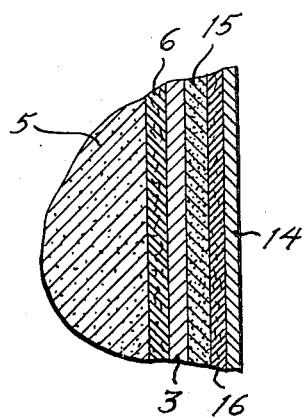
FIG. 3A is an enlarged sectional view taken as indicated on the dry cell of FIG. 3.

FIG. 3 shows likewise a third embodiment of this invention in a dry cell and FIG. 3A is a fragmentary sectional view, greatly enlarged, through a portion of the sidewall thereof. In this embodiment the outer plastic covering 1 of the preceding views is replaced by the outer sheet-metal casing 14. The cardboard layer 16 is coated on the inner surface with an alkaline substance 15.

Although several embodiments of the invention have been illustrated and described hereinabove, further modifications may be made while retaining all or some of the benefits and advantages of the invention.

I claim:

1. A galvanic dry cell comprising a positive electrode assembly, an surrounding negative zinc electrode, an aqueous zinc chloride electrolyte solution therein, and an alkaline substance on the outer surface of the negative zinc electrode.

2. The galvanic dry cell of claim 1 wherein the alkaline substance is in powder form.

3. The galvanic dry cell of claim 1 wherein the alkaline substance is distributed over the surface of an adhesive tape and is adjacent the zinc anode.

4. The galvanic dry cell of claim 1 wherein the alkaline substance is in the form of a coating on the outer surface of the negative zinc electrode.

5. The galvanic dry cell of claim 1 wherein the alkaline substance is from the class consisting of metallic oxides and hydroxides.

6. The galvanic dry cell of claim 5 wherein the metals are alkali metals or alkaline-earth metals.

7. The galvanic dry cell of claim 5 wherein the alkaline-substance is calcium oxide.

8. The galvanic dry cell of claim 1 having a cuplike negative zinc electrode and at least one absorbent washer closing the top thereof.

9. The cell of claim 1 wherein the alkaline substance comprises a metallic oxide, a metallic hydroxide, or a combination thereof.

10. The cell of claim 1 rendered leakproof under discharge load by provision of sufficient alkaline substance to react with and immobilize all effluent aqueous zinc chloride electrolyte in the event of perforation of the negative zinc electrode.

References Cited

UNITED STATES PATENTS

| | | | |
|---|---|---|---|
| 1,276,714 | 8/1918 | Benner | 136—129.1 |
| 1,295,122 | 2/1919 | Chamberlain | 136—179 |
| 1,484,783 | 2/1924 | Heise et al. | 136—127.1 |
| 2,343,194 | 2/1944 | Lawson | 136—103 |
| 3,040,114 | 6/1962 | Huber | 136—103 |
| 3,224,906 | 12/1965 | Deibel et al. | 136—181 |

WINSTON A. DOUGLAS, *Primary Examiner.*

C. F. LeFEVOUR, *Assistant Examiner.*

U.S. Cl. X.R.

136—125